(12) United States Patent
Kubo

(10) Patent No.: US 7,613,387 B2
(45) Date of Patent: Nov. 3, 2009

(54) PHOTOGRAPHING SYSTEM

(75) Inventor: Kenichi Kubo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 11/402,347

(22) Filed: Apr. 11, 2006

(65) Prior Publication Data

US 2006/0233539 A1    Oct. 19, 2006

(30) Foreign Application Priority Data

Apr. 14, 2005    (JP) .............................. 2005-117134

(51) Int. Cl.
*G03B 17/00* (2006.01)
*H04N 5/228* (2006.01)
*G02B 27/64* (2006.01)

(52) U.S. Cl. .................. 396/55; 348/208.99; 359/554

(58) Field of Classification Search .................. 396/55, 396/72, 73, 74; 348/208.99; 359/554–557
See application file for complete search history.

(56) References Cited

U.S. PATENT DOCUMENTS 5,592,335 A * 1/1997 Omi et al. .................. 359/695
6,473,566 B2 * 10/2002 Kasuya ........................ 396/55
2006/0028554 A1 * 2/2006 Usui ..................... 348/208.99

FOREIGN PATENT DOCUMENTS

JP            4-56831 A        2/1992

* cited by examiner

*Primary Examiner*—Melissa J Koval
(74) *Attorney, Agent, or Firm*—Canon U.S.A., Inc. I.P. Division

(57) ABSTRACT

A photographing system includes a lens apparatus having an image blur correcting device configured to correct and/or reduce image blur caused by vibration, a vibration sensor for detecting vibration applied to the lens apparatus, a position detecting device configured to detect a position change of the lens apparatus, and a controlling device configured to control the image blur correcting device using a detection signal of the position detecting device. The photographing system reduces the influence of low frequency noise of a vibration sensor, while maintaining the quality of a vibration isolation function of the lens apparatus.

8 Claims, 6 Drawing Sheets

PHOTOGRAPHING SYSTEM

BACKGROUND OF THE INVENTION

Field of the Invention

The present invention relates to a photographing system provided with a lens apparatus having an image blur correction function.

Recent years have seen an advance in the technology of producing lens apparatuses for television cameras with increased zoom ratio and focal length. However, use of this technology results in image blurring, particularly at telephoto focal length, due to vibration transmitted to a lens apparatus from the wind or from the floor on which the lens apparatus is placed. To address this drawback, a television camera lens apparatus has been developed which is provided with an image blur correction function for compensating image blurring by driving a portion of a lens group included in the lens apparatus.

Generally, a frequency of vibration applied to a television camera lens apparatus ranges from 1 Hz to 15 Hz. A vibration sensor, which can be used for detecting vibration applied to a lens apparatus, transmits a signal containing a signal component that is output in accordance with the vibration and a low frequency noise component of approximately 0.1 Hz. To remove this low frequency noise component from the output signal of the vibration sensor, a high pass filter is provided in a control unit of a vibration proof lens group. However, since a frequency band of the vibration component to be reduced and that of the low frequency noise component are close to each other, a case often occurs where the high pass filter fails to remove low frequency noise components sufficiently. This causes the vibration proof lens group to be driven by the noise components that pass through the high pass filter, resulting in an unintended blurred image of a subject. This is well known as a drift phenomenon that can cause a subject to be viewed moving slowly within a frame.

In consideration of the foregoing, Japanese Patent Laid-Open No. 1992-56831 discusses a technique for eliminating or reducing the effect of low frequency noise by inactivating an image blur correction function when a vibration sensor output satisfies a predetermined condition. However, since vibration sensors output an analogue signal, low frequency noise components vary largely depending on the individual vibration sensors. This can cause a significant difficulty in setting a condition by which a signal component is determined to be or not to be a low frequency noise component. As a condition for distinguishing a low frequency noise component, a small amplitude value can be set, for example. In this case, however, it cannot be possible to detect every low frequency noise component, leaving the low frequency noise problem unsolved. On the other hand, when a large amplitude value is set, a vibration component to be reduced can be misrecognized as a noise component, which reduces the efficiency of a vibration proof function.

SUMMARY OF THE INVENTION

A photographing system according to an exemplary embodiment of the present invention includes: a lens apparatus having an image blur correcting device configured to correct and/or reduce image blur; a vibration sensor for detecting vibration applied to the lens apparatus; a position detecting device configured to detect a position change of the lens apparatus; and a controlling device configured to cause the image blur correcting device to perform image blur correction and/or reduction in accordance with a correction amount which is based on an output value of the vibration sensor, when an output value of the position detecting device is greater than or equal to a predetermined value, and for causing the image blur correcting device not to perform image blur correction and/or reduction, when the output value of the position detecting device is smaller than a predetermined value.

In the photographing system according to an exemplary embodiment of the present invention, an output signal of the position detecting device can be used for controlling the image blur correcting device, so that a drift phenomenon, which is caused by a low frequency noise component from the vibration sensor, can be eliminated or reduced without deteriorating quality of a vibration isolation function.

Further features of the present invention will become apparent from the following description of exemplary embodiments with reference to the attached drawings.

DESCRIPTION OF THE EMBODIMENTS

Figure 1:
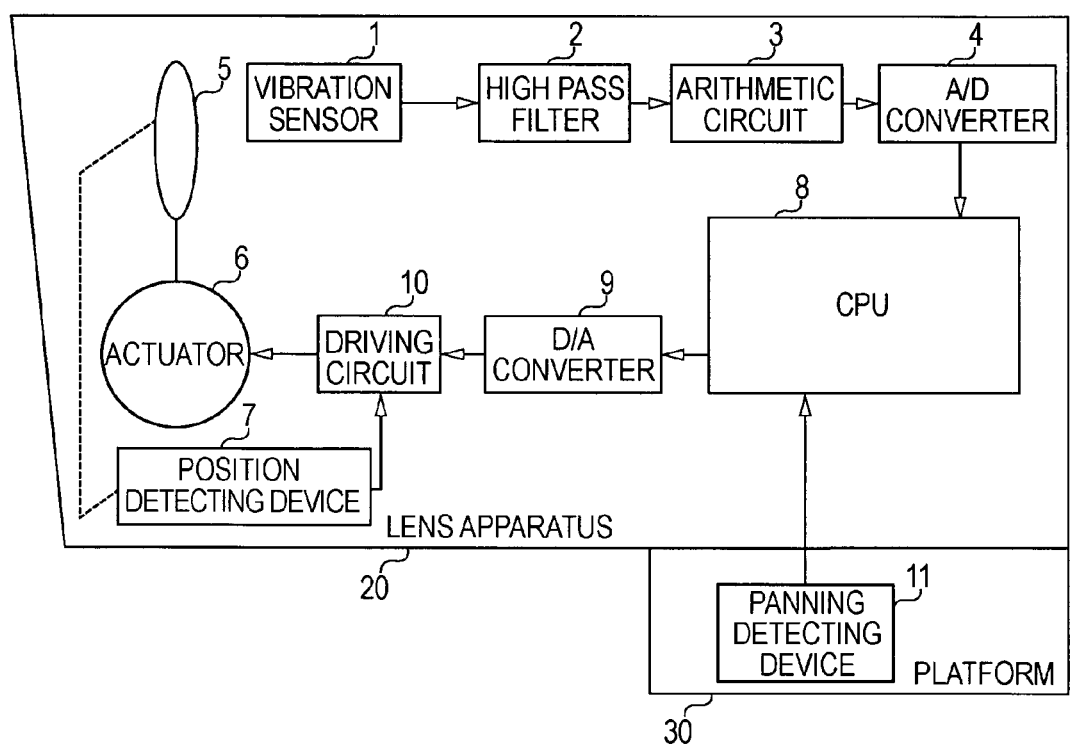
FIG. 1 is a block diagram illustrating a general configuration of a photographing system according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

In all of the examples illustrated and discussed herein any specific values should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

First Exemplary Embodiment

Figure 2:
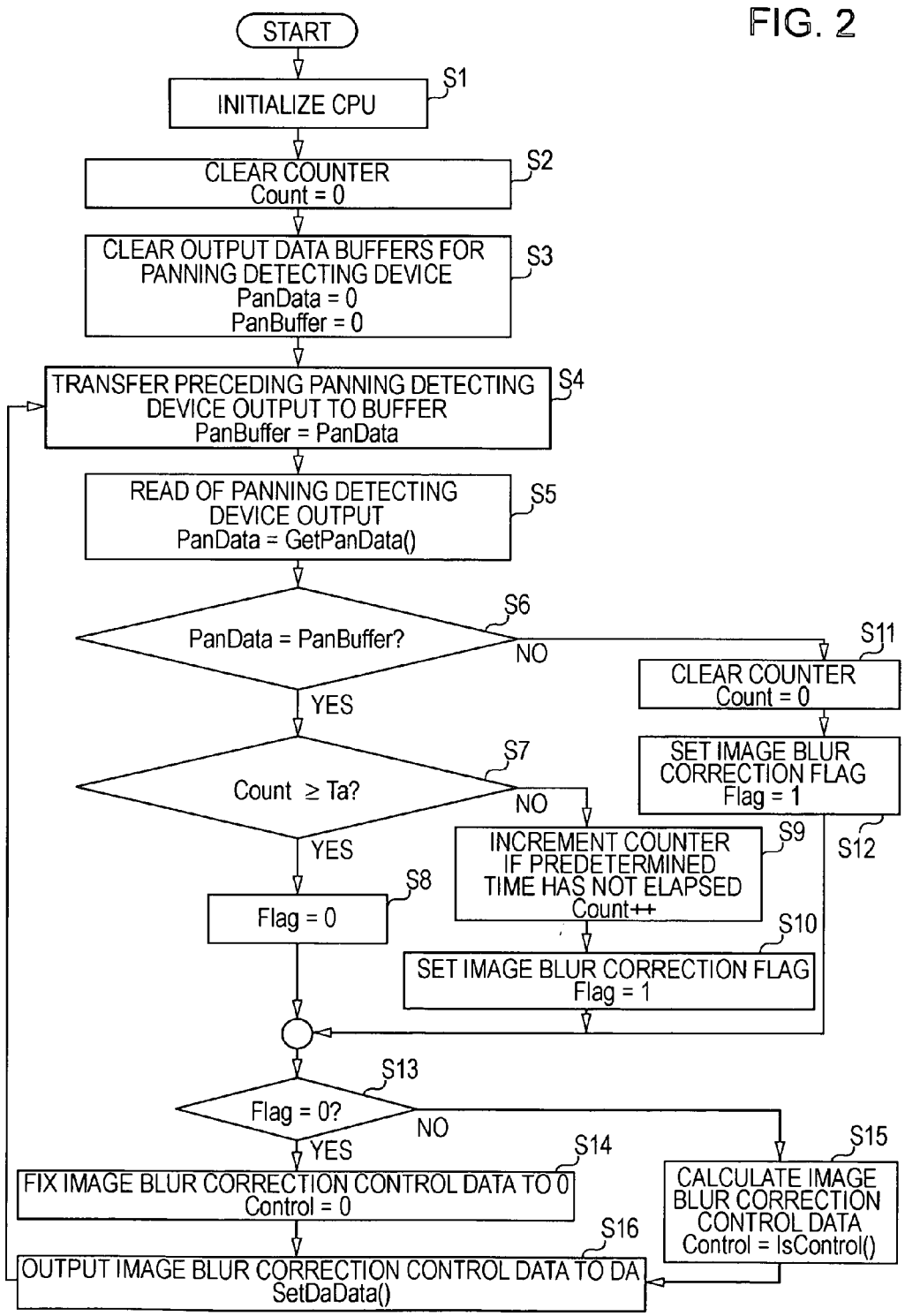
FIG. 2 is a flowchart illustrating a first exemplary embodiment.

Referring to FIGS. 1 and 2, a first exemplary embodiment will be described in detail. FIG. 1 is a block diagram illustrating a general configuration of a photographing system provided with a lens apparatus 20 and a platform 30. The lens apparatus 20 has an image blur correction function. The platform 30 has a detecting device configured to detect a panning operation and a tilting operation of the lens apparatus 20. The lens apparatus 20 also has the following components including: a vibration sensor 1 for detecting vibration applied to the lens apparatus 20; a high pass filter for removing a low frequency noise component contained in an output signal of the vibration sensor 1; an arithmetic circuit 3 for amplifying an output of the high pass filter 2 and converting an angular velocity signal from the vibration sensor 1 into a signal representing an angle; an A/D converter 4 for feeding an output signal received from the arithmetic circuit 3 to a CPU 8; an image blur correction lens group 5 for correcting and/or reducing image blur on an image plane by shifting a portion of the lens group in a direction perpendicular to an optical axis; an actuator 6 for driving the image blur correction lens group 5; a position detecting device 7 for detecting a position of the image blur correction lens group 5; a CPU 8 for calculating a control signal of the image blur correction lens group 5 on the basis of an output of the A/D converter 4; a D/A converter 9 for converting a signal calculated by the CPU 8 into an analogue signal; a driving circuit 10 for driving the actuator 6; and a panning detecting device 11 for detecting a panning operation of the platform 30 and outputting a digital signal representing a value which is proportional to the amount of panning performed in the panning operation. The panning detecting device 11 outputs reference position data when the photographing system is turned on and thereafter outputs relative position data based on the reference position data. The panning detecting device 11 includes, for example, a rotary encoder and a counter.

The flowchart of FIG. 2 illustrates a processing sequence of the CPU 8 of the lens apparatus 20. Operations of the platform 30 include a panning operation associated with movement in a horizontal direction and a tilting operation associated with movement in a vertical direction. The image blur correction lens group 5 is driven in horizontal and/or vertical directions. In this exemplary embodiment, for simplicity, only a panning operation of the platform 30 and a horizontal driving of the image blur correction lens group 5 will be described. When the lens apparatus 20 is turned on through a camera (not shown), the CPU 8 initializes a register, a memory, or the like in the CPU 8, at STEP S1. At STEP S2, the CPU 8 initializes a counter (Count=0) for measuring a time period during which an output of the panning detecting device 11 is held constant. This counter prevents an image blur correction flag (to be hereinafter described) from being unstable, such as repeatedly shifting between a set state and a clear state. At STEP S3, two buffers (PanData, PanBuffer) for output data of the panning detecting device 11 are initialized (PanData=0, PanBuffer=0). Initialization operations are completed thus far, and the CPU 8 proceeds to normal operations starting from STEP S4. Output data of the panning detecting device 11, which is stored in the buffer (PanData) in a preceding sampling process, is transferred to the buffer for panning output data (PanBuffer), at STEP S4. At STEP S5, current output data of the panning detecting device 11 is read and stored in the buffer (PanData). If the values of the two buffers (PanData, PanBuffer) are equal, it is indicated that no panning operation has been performed and that no unintended vibration has been applied to the lens apparatus 20. If the values of the buffers (PanData, PanBuffer) are not equal, it is indicated that the platform 30 is currently engaged in an operation through an operator or that a change is taking place in accordance with vibration which is not intended by an operator. At STEP S6, the values of PanData and PanBuffer are compared. If the two values are equal, indicating that neither a panning operation nor unintended vibration has occurred, a counter value (Count) is checked, at STEP S7. If the counter value (Count) is greater than or equal to a value corresponding to a predetermined time period Ta, indicating that a state in which unintended vibration is not applied has lasted for Ta or longer, the CPU 8 determines that image blur to be reduced has not occurred. In that case, the image blur correction flag is cleared (Flag=0), at STEP S8, and the processing proceeds to STEP S13. This image blur correction flag is indicative of whether or not image blur correction can be executed. If the image blur correction flag is set, image blur correction is performed by driving the image blur correction lens group 5 in accordance with an output of the vibration sensor 1. If the image blur correction flag is clear (Flag=0), the image blur correction lens group 5 is operatively connected to a reference position and image blur correction is not performed, regardless of an output of the vibration sensor 1.

If, in STEP S7, the counter value (Count) is found to be smaller than a value corresponding to a predetermined time period Ta, indicating that the time period Ta during which unintended vibration is not applied has not elapsed, the CPU 8 determines that image blur to be reduced has occurred. In this case, the counter value is incremented (Count=Count+1), at STEP S9, and the image blur correction flag is set, at STEP S10. Then, the processing proceeds to STEP S13.

If, in STEP S6, the values of the two buffers (PanData, PanBuffer) are found to be not equal, indicating that a panning operation has been performed or that unintended vibration has been applied, the processing proceeds to STEP S11. At STEP S11, the counter is cleared (Count=0), and the image blur correction flag is set, at STEP S12.

Then, a state of the image blur correction flag is determined, at STEP S13. If the image blur correction flag is clear, the processing proceeds to STEP S14, and image blur correction control data (Control) is set to be reference position data (Control=0). Then, the image blur correction control data (Control) is output to the D/A converter 9, at STEP S16.

If, in STEP S13, the image blur correction flag is found to be set, the processing proceeds to STEP S15. At STEP S15, vibration components to be reduced are extracted from the outputs of the vibration sensor 1 and the panning detecting device 11 so that the image blur correction control data (Control) is calculated. This calculated image blur correction control data (Control) is output to the D/A converter, at STEP S16.

Hereafter, the processing of STEP S4 through STEP S16 is repeated until the lens apparatus 20 is turned off.

In this exemplary embodiment, a case is described in which an angular velocity signal of the vibration sensor 1 is converted into a signal representing an angle, using the arithmetic circuit 3 constituted by hardware. However, this conversion operation can also be implemented by software. In addition, the vibration sensor 1 can not only be an angular velocity sensor but also be an acceleration sensor such as a linear acceleration sensor. Moreover, the position detecting device according to this exemplary embodiment is configured to detect panning and tilting operations of a lens apparatus. However, the position detecting device can also be a rotary encoder or a potentiometer for detecting the position of a focus lens or a zoom lens contained in a lens apparatus. These configuration modifications can likewise be made in the following exemplary embodiments.

Second Exemplary Embodiment

Figure 3:
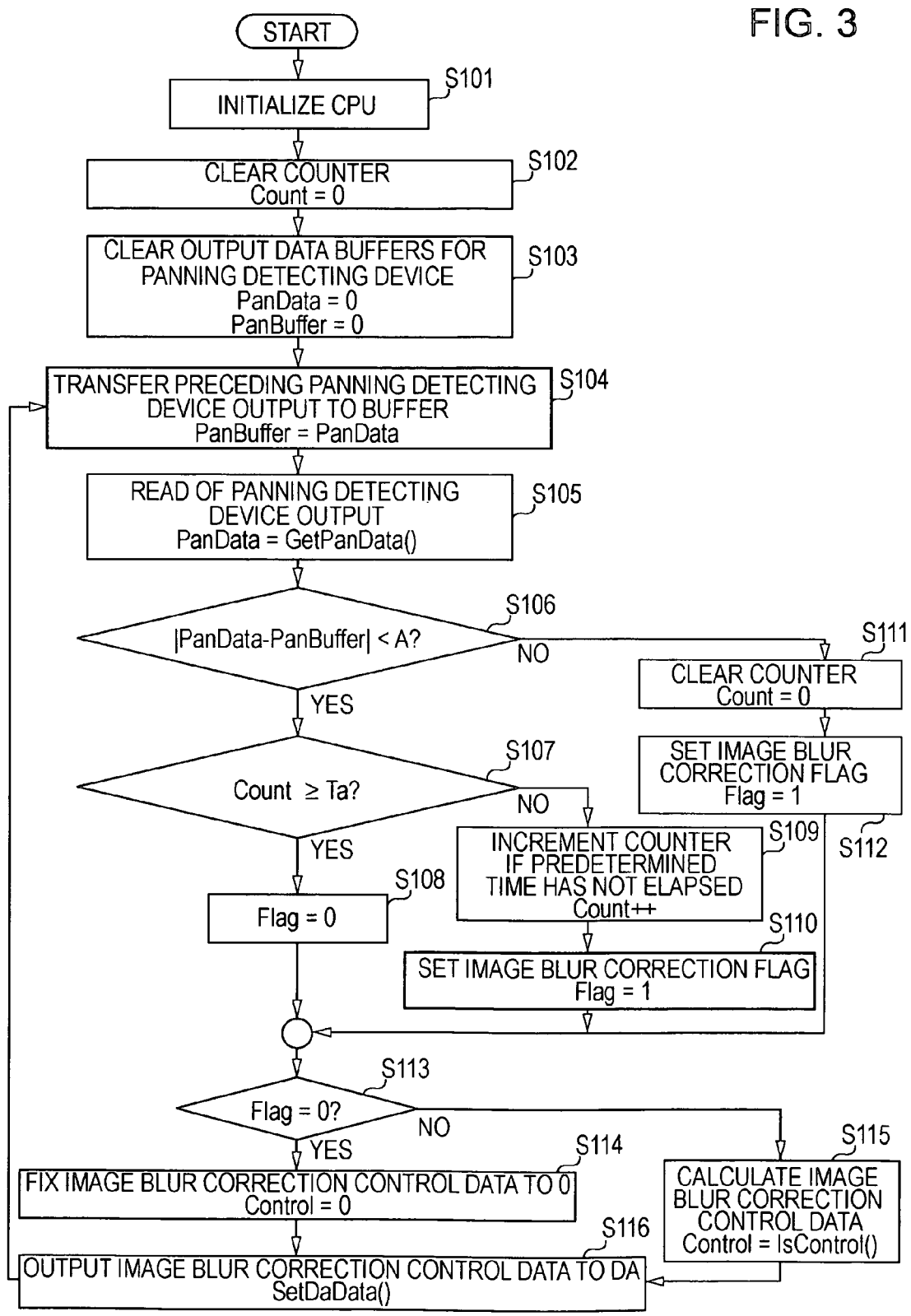
FIG. 3 is a flowchart illustrating a second exemplary embodiment.

Referring to FIG. 3, the second exemplary embodiment according to at least one exemplary embodiment will be described. Since this exemplary embodiment has the same general configuration as the first exemplary embodiment, the description thereof will be omitted. The flowchart of FIG. 3 illustrates a processing procedure of the CPU 8 according to this exemplary embodiment. The processing of STEP S101 through STEP S105 is the same as that of STEP S1 through STEP S5 of FIG. 1, and thus the description thereof will also be omitted. At STEP S106, the values of two buffers (PanData, PanBuffer) are compared. If the absolute value of a difference between PanData and PanBuffer is smaller than a predetermined value A, the processing proceeds to STEP S107. If the absolute value of the difference between PanData and PanBuffer is greater than or equal to the predetermined value A, the processing proceeds to STEP S111.

Since the processing of STEP S107 through STEP S116 is the same as that of STEP S7 through STEP S16, the description thereof will be omitted. Hereafter, the processing of STEP S104 through STEP S116 is repeated until the lens apparatus 20 is turned off.

Third Exemplary Embodiment

Figure 4:
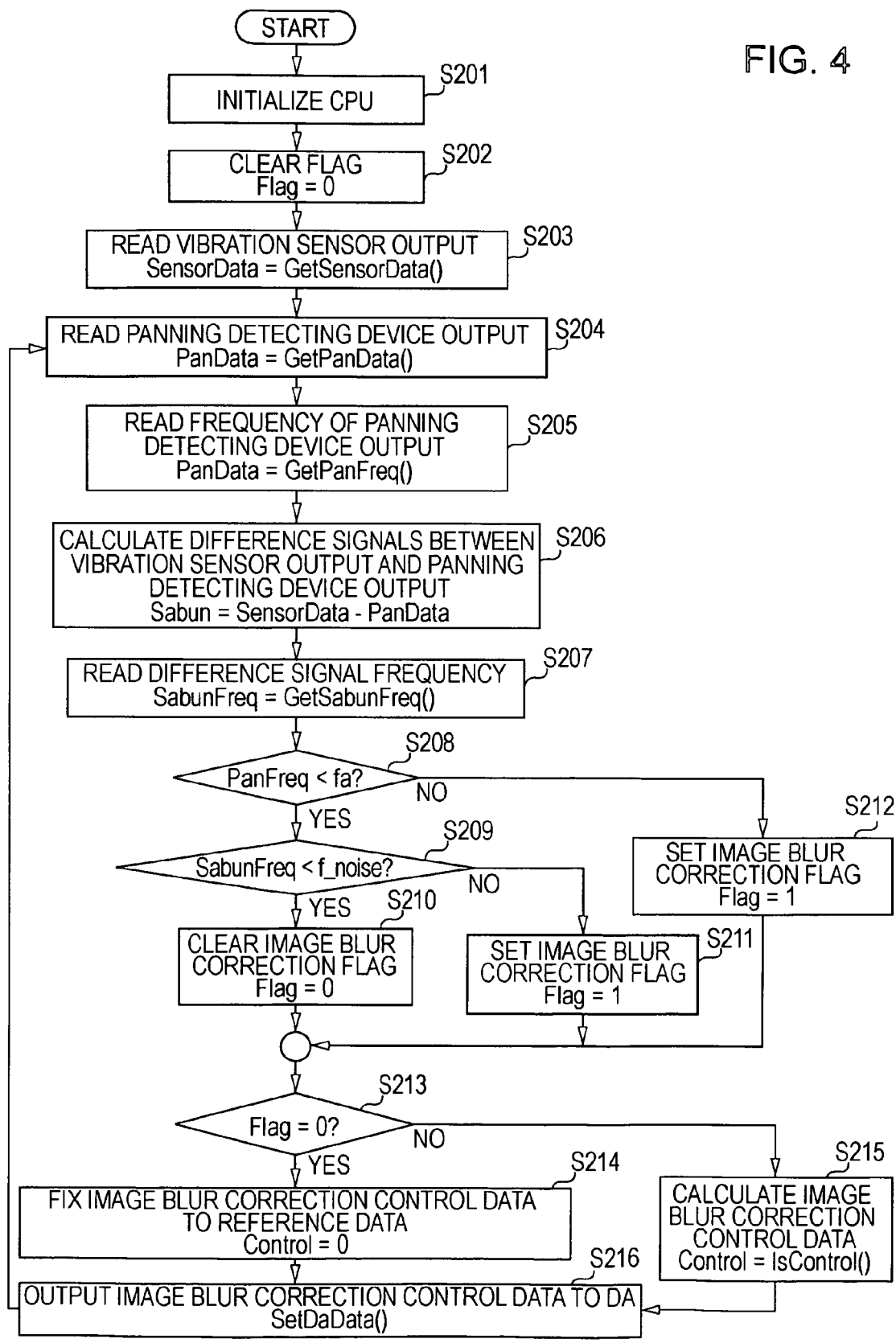
FIG. 4 is a flowchart illustrating a third exemplary embodiment.

Referring to FIG. 4, the third exemplary embodiment according to at least one exemplary embodiment will be described. Since this exemplary embodiment has the same general configuration as the first exemplary embodiment, the description thereof will be omitted. The flowchart of FIG. 4 illustrates a processing procedure of the CPU 8 according to this exemplary embodiment. When the lens apparatus 20 is turned on through a camera (not shown), the CPU 8 initializes a register, a memory, or the like within the CPU 8, at STEP S201. Then, the CPU 8 clears an image blur correction flag (Flag=0), thereby completing the initialization operations and proceeding to normal operations starting from STEP S203. An output of the vibration sensor 1 (hereinafter referred to as a vibration sensor output) is read through the A/D converter and set as SensorData, at STEP S203. At STEP S204, an output of the panning detecting device 11 (hereinafter referred to as a panning detecting device output) is read and set as PanData. At STEP S205, the panning detecting device output is input to a frequency estimation function, so that an output signal frequency is calculated. The calculated frequency can be set as PanFreq. This frequency estimation function outputs the highest frequency among frequencies (frequency component) contained in input data. Although the frequency estimation function is implemented by software in this exemplary embodiment, it can also be implemented by hardware.

At STEP S206, a difference signal (Sabun) corresponding to a difference between the vibration sensor output (SensorData) and the panning detecting device output (PanData) is calculated and stored in a buffer.

When an operator applies vibration to the lens apparatus 20 on purpose, such as panning a camera, there is no substantial phase difference between the vibration sensor output and the panning detecting device output. Therefore, a difference signal to be calculated will be synchronized with the vibration applied by the operator. In a case where unintentional vibration can be applied to the lens apparatus 20, there is no substantial phase difference between the vibration sensor output and the panning detecting device output, and the difference signal to be calculated will be synchronized with the unintended vibration. Thus, in either case where the lens apparatus 20 receives intended vibration or where the lens apparatus 20 receives unintended vibration, there is no substantial phase difference between the vibration sensor output and the panning detecting device output, resulting in a difference signal that is synchronized with the vibration. This allows the CPU 8 to distinguish a noise component from the vibration sensor 1 by examining the difference signal.

In a case where no vibration can be applied to the lens apparatus 20, the panning detecting device 11 maintains an output of a constant value. On the other hand, the vibration sensor outputs a low frequency signal which is a noise component, in spite of the absence of vibration. Therefore, a calculation of a difference between the vibration sensor output and the panning detecting device output yields a value corresponding to a noise component of the output signal from the vibration sensor 1. If the panning detecting device output is synchronized with neither the vibration sensor output nor the difference signal between the vibration sensor output and the panning detecting device output, the vibration sensor output can be determined to be noise. In this manner, using an output of the panning detecting device 11, such as a rotary encoder, which produces an equivalently small amount of noise, a difference signal between a vibration sensor output and a panning detecting device output is monitored. This enables it to be determined whether an output signal from the vibration sensor 1 is a vibration component or a noise component more accurately, compared with a case where only a vibration sensor that produces an output containing a noise component is used.

At STEP S207, the difference signal (Sabun) is input to a frequency estimation function, and the calculated frequency can be set as SabunFreq.

At STEP S208, the frequency of the output signal of the panning detecting device 11 and a lowest frequency fa of an image blur correction frequency band are compared. This lowest frequency fa of an image blur correction frequency band is the lowest frequency in the band of frequencies for which image blur correction is performed. Thus, on a signal, which can have a frequency lower than fa, no image blur correction is performed. If the frequency of the panning detecting device output signal (PanFreq) is lower than fa, then the difference signal frequency (SabunFreq) and a noise determination frequency (f_noise) are compared, at STEP S209. This noise determination frequency (f_noise) is the highest frequency of a low frequency noise component output from the vibration sensor 1. An output with a frequency higher than the noise determination frequency (f_noise) is regarded as a vibration component to be reduced which is detected by the vibration sensor 1. If the difference signal frequency (SabunFreq) is lower than the noise determination frequency (f_noise), the difference signal corresponds to a low frequency noise component of the output signal from the vibration sensor 1. In this case, the image blur correction flag is cleared (Flag=0), at STEP S210, and the processing proceeds to STEP S213.

If the difference signal frequency (SabunFreq) is found to be higher than or equal to the noise determination frequency (f_noise) in STEP S209, the difference signal is determined to be a vibration component to be reduced. In this case, the image blur correction flag is set (Flag=1), at STEP S211, and the processing proceeds to STEP S213.

If, in STEP S208, the frequency of the panning detecting device output signal (PanFreq) is found to be higher than or equal to the lowest frequency fa of the image blur correction frequency band, the panning detecting device output signal is determined to be a vibration component to be reduced. In this case, the image blur correction flag is set (Flag=1), at STEP S212, and the processing proceeds to STEP S213.

Figure 5:
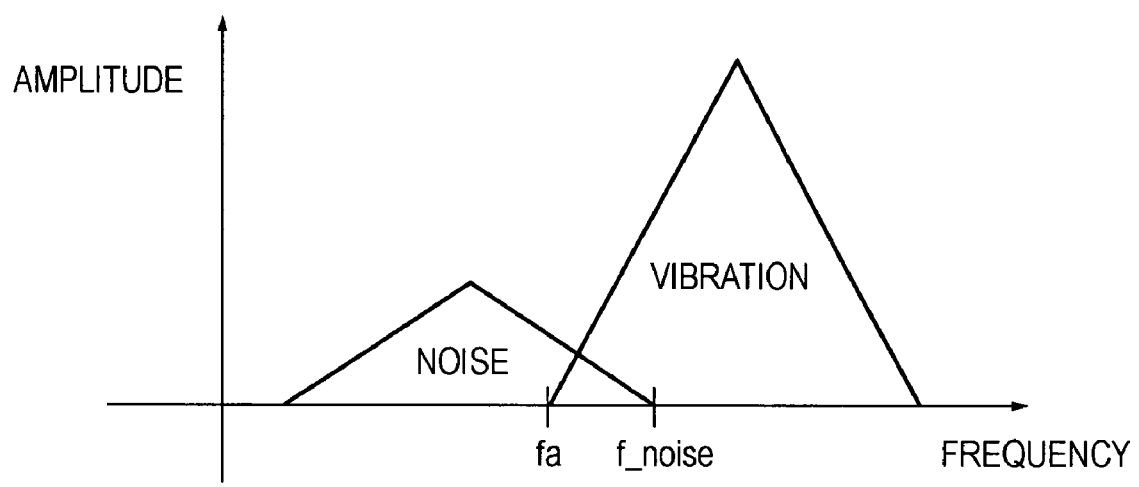
FIG. 5 is a graph illustrating a relation between an image blur correction frequency band and a noise determining frequency.

In at least one exemplary embodiment the lowest frequency fa of the image blur correction frequency band is set to be lower than the noise determination frequency (f_noise), as illustrated in FIG. 5. The lowest frequency fa of the image blur correction frequency band is set to be the lowest frequency of a vibration component that can be detected by the panning detecting device 11. This enables image blur correction to be performed on any vibration component. In addition, by setting the noise determination frequency (f_noise) to be the highest frequency of a noise component that can be output by the vibration sensor 1, a drift phenomenon due to low frequency noise can be eliminated or reduced.

In STEP S213, if the image blur correction flag is found to be clear (Flag=0), the image blur correction control data is set to be the reference position data (Control=0), at STEP S214. Then, the image blur correction control data (Control) is output to the D/A converter 9, at STEP S216.

If the image blur correction flag is found to be set (Flag=1) in STEP S213, image blur correction control data (Control) is calculated on the basis of the vibration sensor output signal read through the high pass filter 2, arithmetic circuit 3, and A/D converter 4, at STEP S215. The calculated data is output to the D/A converter 9, at STEP S216. Hereafter, the processing of STEP S203 through STEP S216 will be repeated until the lens apparatus 20 is turned off.

As with the cases of the first and second exemplary embodiments, the photographing system according to this exemplary embodiment can also prevent an image blur correction flag from being unstable, such as repeatedly shifting between a set state and a clear state. For example, a counter can be employed for measuring a time period during which a frequency of the panning detecting device output signal (PanFreq) stays lower than the lowest frequency fa of an image blur correction frequency band. Another counter can also be used for measuring a time period during which a difference signal frequency (SabunFreq) stays lower than a noise determination frequency (f_noise).

Fourth Exemplary Embodiment

Figure 6:
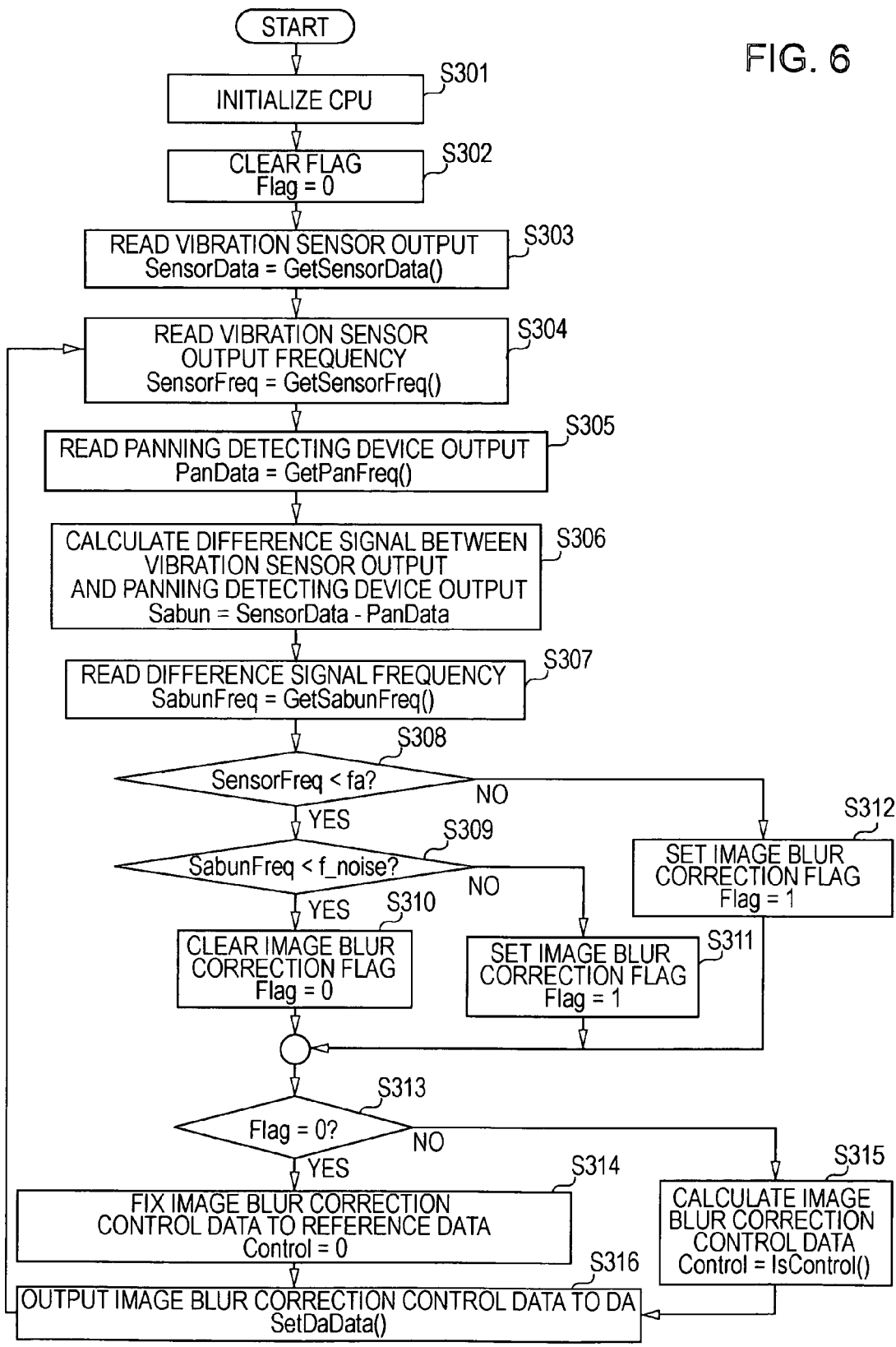
FIG. 6 is a flowchart illustrating a fourth exemplary embodiment.

Referring now to FIG. 6, the fourth exemplary embodiment according to at least one exemplary embodiment will be described. Since the first exemplary embodiment and this exemplary embodiment have the same general configuration, the description thereof will be omitted. The flowchart of FIG. 6 illustrates a processing procedure of the CPU 8. The processing of STEP S301 through STEP S303 is the same as that of STEP S201 through STEP S203 of FIG. 4, and thus the description thereof will be omitted. At Step S304, an output of the vibration sensor 1 (SensorData) is input to a frequency estimation function, and the calculated frequency of the vibration sensor output signal can be set as SensorFreq. This frequency estimation function is configured to output the highest frequency among frequencies (frequency component) contained in input data. The frequency estimation function can be implemented either by software or by hardware to yield the same result. At STEP 305, an output of the panning detecting device 11 is read and set as PanData. The processing of STEP S306 through STEP S307 is the same as that of STEP S206 through STEP S207, and thus the description thereof will be omitted. At STEP S308, the frequency of the vibration sensor output signal (SensorFreq) and a lowest frequency fa of an image blur correction frequency band are compared. The lowest frequency fa of the image blur correction frequency band is the lowest frequency in the band of frequencies for which image blur correction is performed. Therefore, image blur correction is not performed on signals whose frequencies are lower than fa, such as low frequency noise components output from the vibration sensor 1. If, in STEP S308, the frequency of the vibration sensor output signal (SensorFreq) is found to be lower than the lowest frequency fa of the image blur correction frequency band, the processing proceeds to STEP S309. At STEP S309, a difference signal frequency (SabunFreq) and a noise determination frequency (f_noise) are compared. This noise determination frequency (f_noise) is the highest frequency of a low frequency noise component output from the vibration sensor 1. An output of a frequency higher than the f_noise is a vibration component which is detected by the vibration sensor 1 and can be reduced. If the difference signal frequency (SabunFreq) is lower than the noise determination frequency (f_noise), the difference signal is a noise component of the output signal of the vibration sensor 1. In this case, the image blur correction flag is cleared (Flag=0), at STEP S310, and the processing proceeds to STEP S313. If, in STEP S309, the difference signal frequency (SabunFreq) is found to be higher than or equal to the noise determination frequency (f_noise), the difference signal is determined to be a vibration component corresponding to vibration which has been applied to the lens apparatus 20 and can be reduced. In this case, the image blur correction flag is set, at STEP S311, and the processing proceeds to STEP S313.

If, in STEP S308, the frequency of the vibration sensor output signal (SensorFreq) is found to be higher than or equal to the lowest frequency fa of the image blur correction frequency band, the vibration sensor output signal is determined to be a vibration component to be reduced. In this case, the image blur correction flag is set (Flag=1), at STEP S312, and the processing proceeds to STEP S313.

Hereafter, the processing of STEP S313 through STEP S316 is the same as that of STEP S213 through STEP S216, and thus the description thereof will be omitted. The processing of STEP S303 through STEP S316 is repeated until the lens apparatus 20 is turned off.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Patent Application No. 2005-117134 filed Apr. 14, 2005, which is hereby incorporated by reference herein in its entirety.

What is claimed is:

1. A photographing system comprising:
   a lens apparatus having an image blur correcting device configured to correct and/or reduce image blur;
   a vibration sensor for detecting vibration applied to the lens apparatus;
   a position detecting device configured to detect a position change of the lens apparatus; and
   a controlling device configured to cause the image blur correcting device not to perform image blur correction, when a difference signal between an output signal of the vibration sensor and an output signal of the position detecting device has a frequency lower than a noise determination frequency which is specific to the vibration sensor,
   wherein the controlling device causes the image blur correcting device not to perform image blur correction, when the highest frequency of the output signal of the position detecting device is lower than the lowest frequency of a predetermined image blur correction frequency band and when the difference signal has a frequency lower than the noise determination frequency which is specific to the vibration sensor.

2. The photographing system of claim 1, wherein the lowest frequency of the image blur correction frequency band is lower than the noise determination frequency.

3. The photographing system of claim 1,
   wherein the controlling device causes the image blur correcting device not to perform image blur correction, when the highest frequency of the output signal of the vibration sensor is lower than the lowest frequency of a predetermined image blur correction frequency band and when the difference signal has a frequency lower than the noise determination frequency which is specific to the vibration sensor.

4. The photographing system of claim 1,
wherein the controlling device causes the image blur correcting device not to perform image blur correction, when the difference signal continuously has a frequency lower than the noise determination frequency which is specific to the vibration sensor, for a predetermined time period.

5. The photographing system of claim 1,
wherein the position detecting device detects at least either a panning operation or a tilting operation of the lens apparatus.

6. The photographing system of claim 1, wherein the position detecting device comprises a rotary encoder.

7. A photographing system comprising:
a lens apparatus having an image blur correcting device configured to correct and/or reduce image blur;
a vibration sensor for detecting vibration applied to the lens apparatus;
a position detecting device configured to detect a position change of the lens apparatus; and
a controlling device configured to cause the image blur correcting device not to perform image blur correction, when a difference signal between an output signal of the vibration sensor and an output signal of the position detecting device has a frequency lower than a noise determination frequency which is specific to the vibration sensor,
wherein the controlling device causes the image blur correcting device not to perform image blur correction, when the highest frequency of the output signal of the vibration sensor is lower than the lowest frequency of a predetermined image blur correction frequency band and when the difference signal has a frequency lower than the noise determination frequency which is specific to the vibration sensor.

8. A photographing system comprising:
a lens apparatus having an image blur correcting device configured to correct and/or reduce image blur;
a vibration sensor for detecting vibration applied to the lens apparatus;
a position detecting device configured to detect a position change of the lens apparatus; and
a controlling device configured to cause the image blur correcting device not to perform image blur correction, when a difference signal between an output signal of the vibration sensor and an output signal of the position detecting device has a frequency lower than a noise determination frequency which is specific to the vibration sensor,
wherein the controlling device causes the image blur correcting device not to perform image blur correction, when the difference signal continuously has a frequency lower than the noise determination frequency which is specific to the vibration sensor, for a predetermined time period.

* * * * *